(12) United States Patent
Mason

(10) Patent No.: US 7,531,152 B2
(45) Date of Patent: May 12, 2009

(54) MINERALIZATION OF ALKALI METALS, SULFUR, AND HALOGENS

(75) Inventor: J. Bradley Mason, Pasco, WA (US)

(73) Assignee: Studsvik, Inc., Columbia, SC (US)

( * ) Notice: Subject to any disclaimer, the term of this patent is extended or adjusted under 35 U.S.C. 154(b) by 0 days.

(21) Appl. No.: 10/374,293

(22) Filed: Feb. 26, 2003

(65) Prior Publication Data

US 2005/0276737 A1    Dec. 15, 2005

Related U.S. Application Data

(63) Continuation-in-part of application No. 10/246,266, filed on Sep. 18, 2002, now Pat. No. 7,011,800, which is a continuation-in-part of application No. 10/185,616, filed on Jun. 28, 2002, which is a continuation-in-part of application No. 10/111,148, filed as application No. PCT/US00/41323 on Oct. 19, 2000.

(51) Int. Cl.
   *C01B 3/38* (2006.01)
(52) U.S. Cl. .......................... 423/201; 423/179
(58) Field of Classification Search .............. 423/213.2, 423/213.5, 240 S, 244.01, 244.03, 244.04, 423/179, 1, 210, 257.5, 201, 202, 203, 209; 588/231, 234, 235, 248, 244, 245, 246
See application file for complete search history.

(56) References Cited

U.S. PATENT DOCUMENTS

| | | | |
|---|---|---|---|
| 3,907,674 A | | 9/1975 | Roberts et al. |
| 4,154,643 A | * | 5/1979 | Cook et al. ................. 162/30.1 |
| 4,191,733 A | | 3/1980 | Swift et al. |
| 4,218,427 A | | 8/1980 | Yan |
| 4,224,289 A | | 9/1980 | Covey et al. |
| 4,226,830 A | | 10/1980 | Davis |
| 4,448,589 A | | 5/1984 | Fan et al. |
| 4,483,692 A | | 11/1984 | Patel |
| 4,609,537 A | | 9/1986 | Tolpin et al. |
| 4,656,147 A | | 4/1987 | Iida et al. |
| 4,662,081 A | | 5/1987 | Greenwood |
| 4,664,678 A | | 5/1987 | Rehmat et al. |
| 4,665,632 A | | 5/1987 | Greenwood |
| 4,668,435 A | * | 5/1987 | Grantham .................... 588/19 |
| 4,692,318 A | | 9/1987 | Tolpin et al. |
| 4,726,916 A | | 2/1988 | Aubert et al. |
| 4,966,101 A | | 10/1990 | Maeda et al. |
| 4,982,027 A | * | 1/1991 | Korff et al. .................. 585/241 |
| 4,993,323 A | | 2/1991 | Tabery et al. |
| 5,084,258 A | | 1/1992 | Linn |
| 5,224,334 A | | 7/1993 | Bell |
| 5,378,443 A | | 1/1995 | Engstrom et al. |
| 5,387,738 A | | 2/1995 | Beckham et al. |
| 5,518,702 A | | 5/1996 | Perry |
| 5,536,896 A | | 7/1996 | Hesbol et al. |
| 5,681,447 A | * | 10/1997 | Maycock et al. ............ 205/536 |
| 5,707,592 A | | 1/1998 | Someus |
| 5,909,654 A | | 6/1999 | Hesbol |
| 6,084,147 A | | 7/2000 | Mason |
| 6,133,498 A | | 10/2000 | Singh et al. |
| 6,211,254 B1 | | 4/2001 | Whitney |
| 6,280,694 B1 | | 8/2001 | Mason |
| 6,281,164 B1 | | 8/2001 | Demmel et al. |
| 7,011,800 B1 | | 3/2006 | Mason |
| 2003/0198584 A1 | | 10/2003 | Mason |
| 2005/0096495 A1 | | 5/2005 | Mason |

FOREIGN PATENT DOCUMENTS

| | | |
|---|---|---|
| EP | 0471278 | 2/1992 |
| FR | 2106844 A | 5/1972 |
| GB | 2048555 A | 12/1980 |
| GB | 2271517 | 4/1994 |
| JP | 01171685 | 6/1989 |
| RU | 2216396 | 11/2003 |
| WO | WO 9408661 | 4/1994 |
| ZA | 200203941 | 1/2003 |

OTHER PUBLICATIONS

Scott Jeffers, John F. Mullen, Austin J. Cohen and Ky Dangtran, Control Problem Waste Feeds in Fluid Beds, May 1999, 5 Pages.
Clarence J. Wall, John T. Graves and Elliott J. Roberts, How to Burn Salty Sludges, Apr. 14, 1975, 6 Pages.
Joseph A. Nenni, Richard D. Boardman, Thermal Denitration and Mineralization of Waste Constituents, 14 Pages.
Webpage—Alternative High-Level Waste Treatments at the Idaho National Engineering & Environmental Laboratory; ;http:///books.nap.edu/books/030906628X/html/56.html; 2 pages ; dated Sep. 25, 2004.
Webpage Alternative High-Level Waste Treatments at the Idaho National Engineering And Environmental Laboratory; http://books.nap.edu/books/030906628X/html/56.html; 2 pages dated Sep. 25, 2004.
Cementitious Solidification of DOE's Legacy Reprocessing Waste by Darryl D. 'Siemer of Idaho national Engineering and Environmental Laboratory.
Patent Abstracts of Japan vol. 013, No. 447 (C-642), Oct. 6, 1989 & JP 01 171685 A (Mitsui Eng & Shipbuild Co. Ltd) Jul. 6, 1989.

* cited by examiner

*Primary Examiner*—Edward M Johnson
(74) *Attorney, Agent, or Firm*—King & Spalding

(57) ABSTRACT

A system and method for conversion of alkali metals, heavy metals, halogens, and sulfur into mineral products. The system includes a single reaction vessel. To begin the process, co-reactants such as lime and clay are mixed with waste feeds containing alkali metals, heavy metals, halogens, and sulfur. This mixture is then introduced into the reaction vessel. The reaction vessel is operated under reducing conditions. After the mineral products are allowed to form, they are collected from the reaction vessel.

14 Claims, 1 Drawing Sheet

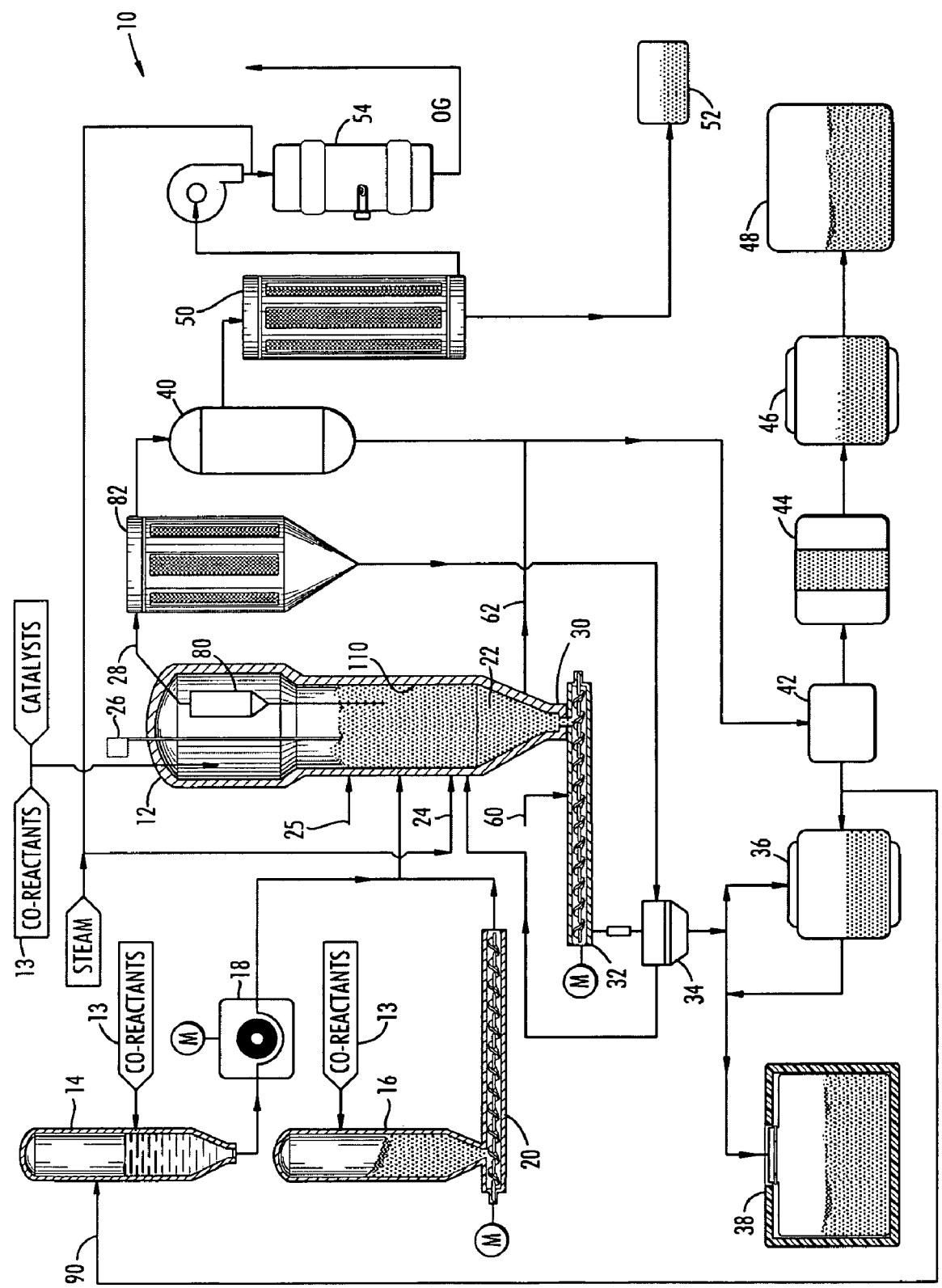

MINERALIZATION OF ALKALI METALS, SULFUR, AND HALOGENS

CROSS REFERENCE TO RELATED APPLICATIONS

This application is a continuation-in-part application to U.S. patent application Ser. No. 10/246,266, filed Sep. 18, 2002 which is a continuation-in-part of U.S. patent application Ser. No. 10/185,616 filed Jun. 28, 2002, which is a continuation-in-part application to U.S. patent application Ser. No. 10/111,148 filed Apr. 19, 2002, which is the national phase application of PCT/US00/41323, filed Oct. 19, 2000, which is the PCT application of U.S. Pat. No. 6,280,694, filed Oct. 20, 1999.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISK APPENDIX

Not Applicable.

BACKGROUND OF THE INVENTION

The present invention relates generally to a process for treating wastes containing alkali metals, sulfur, heavy metals, boron compounds, and halogens. More specifically, the invention relates to a process for converting alkali metals, sulfur, heavy metals, and halogens into stable mineral forms through the use of a fluidized bed.

There exist many hazardous waste materials that are difficult to dispose because of the possibility that they may contaminate the environment. Such hazardous materials include compounds like heavy metals, sulfur, and halogens. These materials can be commonly found in many wastes, products, and compounds.

Typically, such hazardous waste is either buried or burned, both of which can be costly processes. Accordingly, it is desirable to process such wastes into materials that are more easily disposed of at lower costs. A large number of methods for treatment of such materials are known.

Alkali metals, which refer primarily to the elements of sodium and potassium, sulfur, and halogens are commonly found in such waste feed materials as sodium nitrate, potassium nitrate, sodium sulfates, and sodium chloride. In the past, such waste materials have typically been treated through processes like pyrolysis, incineration, and catalytic cracking. The catalytic cracking methods suffer from the draw back that they can only be used for treating materials having low contents of halogen-containing polymer materials. Further the cracking method is very expensive, and large acid resistant plants are needed for carrying out the method. Incineration processes are also disadvantageous, because these processes are becoming unacceptable from an environmental standpoint. Incinerators and related processes that utilize open-flame combustion fall under stringent and comprehensive air pollution laws that typically render the incinerators economically infeasible.

Pyrolysis methods are generally more flexible and can be used for the treatment of most waste materials. However, secondary waste streams that are generated from these processes, such as particulate waste and off gases, still present disposal issues that must be addressed.

Another problem associated with prior art waste processing methods involves sulfur-containing compounds. For example, the presence of such sulfur compounds in a vitrification melter can cause a molten sulfur salt pool to accumulate on top of the molten inorganic residue (glass). This pool causes high corrosion rates for the melter equipment. The pool can also have a high electrical conductivity, which causes short-circuiting of the heating electrodes in the melter. Additionally, potentially explosive conditions can result if large quantities of water contact the molten sulfur salt pool.

Further, the presence of heavy metals in the inorganic residues that may be present in the waste feeds can render the final waste product hazardous, thereby requiring additional processing of the residue before disposal or higher disposal costs. Also, the inorganic residue can contain soluble components that may form aqueous solutions after processing; these solutions can result in contamination of the surroundings after disposal.

Accordingly, there remains a need for a process that does not have the limitations and shortcomings of the above described methods for processing waste materials containing alkali metals, heavy metals, halogens, and sulfur.

SUMMARY OF THE INVENTION

According to its major aspects and briefly recited, the present invention is a method and apparatus for converting alkali metals, heavy metals, halogens, and sulfur to synthetic, naturally occurring mineral products, and, preferably, water-insoluble mineral products, through the use of a non-incineration, fluid bed reactor. To initiate the process, heterogenous waste containing a mixture of sulfur, alkali metals, heavy metals, and halogens, is fed into the reactor along with a fluidizing gas composed of steam and, preferably, super-heated steam. Optionally, the steam can be generated from the evaporation of water from the waste feed, while the fluidizing gases can be an inert gas or gases.

In addition to the introduction of steam and waste feed, co-reactants, such as clay and lime, are mixed with the heterogenous waste feed or separately introduced into the fluid bed reactor. In the context of this discussion, the term "co-reactants" refers to compounds that are reacted with the alkali metals, heavy metals, sulfur, and halogens to form synthetic naturally occurring mineral products. Not only can these co-reactants be used to form stable minerals, but they may also be used to achieve higher melting point solid products. After the mineral products are formed within the fluid bed reactor, the larger solid products are removed from the bottom of the reactor and thereafter disposed. Any undersized product that is potentially formed and that is carried out through the gas stream generated by the process can be recycled to the reaction vessel where it can be made to grow larger for more convenient disposal.

In the preferred embodiment of the present invention, a single vessel containing fluidized media is utilized. This fluidized media includes such materials as inert media, reductants, and catalysts. Preferably, the fluid bed reactor is operated under reducing conditions, and endothermic reactions, rather than exothermic, oxidizing reactions, are employed to convert the alkali metals, heavy metals, sulfur, and halogens into stable minerals. Although the waste feed may contain little or no carbonaceous materials, carbonaceous materials are present in the reaction vessel and are used as the heat source to evaporate water in the waste feed. Carbonaceous materials also act as reductants to regenerate metal catalysts within the fluidized bed. Optionally, a portion of the fluid bed can be operated under oxidizing conditions so as to avoid the release of synthesis gases such as $H_2$ and CO. However, at least one reducing portion must also be present in the case there is an oxidizing zone being employed.

A feature of the present invention is the use of fluidized media that can be any combination of carbonaceous materials, product solids, inert media, co-reactants, and catalysts. Depending on the relative proportions of alkali metals, heavy metals, halogens, and sulfur present within the heterogenous waste feed, the process can be optimized by using various combinations of fluidized media.

Another feature of the present invention is the use of co-reactants and/or additives, such as lime, calcium compounds, clay, magnesium compounds, aluminum compounds, phosphate compounds, iron compounds, and silica compounds, to form higher melting point solid products, as well as synthetic naturally occurring minerals that are preferably water-insoluble. The formation of water-insoluble minerals is advantageous because they are more easily disposed of and processed. Typically, water-soluble compounds that also contain radioactive isotopes will most likely require further stabilization prior to disposal to prevent water dissolution of the buried product into the ground water. Further, the formation of higher melting point compounds helps to prevent formation of large agglomerations in the reaction vessel. Although some agglomeration is preferred to increase the size of the mineral products, agglomeration to the point of ceasing the fluidization of the reactor is not desirable. The method of the present invention also provides for the conversion of reactive metals and compounds into stable compounds. Such compounds as metallic sodium, potassium, calcium, magnesium, plutonium, uranium, and compounds, such as cyanide, are potentially reactive materials that can ignite, burn, or even explode when exposed to certain other materials or when exposed to varied environmental conditions.

The mixing of the co-reactants with the heterogenous waste before introducing these materials into the reaction vessel is also a feature of the present invention. Although it is possible to also introduce the co-reactants directly to the reaction vessel rather than mixing with the waste, the mixing of the effective amount of co-reactants, such as clay and lime, with wastes containing alkali metals, heavy metals, halogens, and sulfur, allows these waste materials to be bound in stable mineral form. Not only does this feature result in easier disposal of the heterogenous waste, but also the process results in little to no inventory of unreacted co-reactant in the reaction bed. Accordingly, the amount of co-reactants within the fluid bed can be controlled so that agglomeration can occur so that the mineral products can be made to grow larger. Further, the final product weight can be controlled if there is not a large inventory of un-reacted, or unbound co-reactants. However, the presence of small amounts of co-reactants can help prevent agglomeration to the point of ceasing the fluidization of the reactor.

Yet another feature of the present invention is the use of fluid bed reactor having at least one reducing, or oxygen-starved, zone or portion. The use of a reducing zone is preferable so as to avoid incineration and/or burning operations. Further, it is believed that reducing conditions result in a higher retention of sulfur, halogens, and heavy metals in the mineralized product. Finally, in the case that the waste feed also contains nitrates or nitrogen containing compounds, the reducing conditions prevent the formation of nitrogen oxides (NOx) by directly converting nitrates to nitrogen gas.

The use of carbonaceous reductants to regenerate co-reactants and/or additives is also a feature of the present invention. For example, carbonaceous reductants can be used to reduce $Fe_2O_3$ and $Fe_3O_4$ to FeO and/or Fe. The Fe or FeO can then serve as co-reactants.

Other advantages of the present invention will be apparent to those skilled in the art from a careful reading of the Detailed Description of the Preferred Embodiment presented below and accompanied by the drawing.

BRIEF DESCRIPTION OF THE DRAWING

The FIGURE is a schematic illustration of a system for converting alkali metals, heavy metals, halogens, and sulfur into synthetic, naturally occurring minerals according to a preferred embodiment of the present invention.

DETAILED DESCRIPTION OF PREFERRED EMBODIMENT

The present invention is an apparatus and process for converting alkali metals, sulfur, and halogens into synthetic, naturally occurring minerals. The present apparatus and process will be described in particular with respect to radioactive waste; however, any waste or product stream containing alkali metals, heavy metals, halogens, and/or sulfur can be processed in accordance with the following process and with the components of the system. The waste stream may also contain boron compounds and phosphates, and may have any concentration of alkali metals, sulfur, and/or halogens, and may also contain levels of heavy metals and radionuclides, but, preferably, only contains less than 5% carbonaceous or organic content. Accordingly, the waste feed make up mainly includes non-combustible and non-organic materials. Further, the waste feed can have any pH value, and need not be pre-processed before being introduced into the process.

The process is based on a fluidizing bed reaction vessel using steam for fluidizing which may be operated under strongly reducing conditions or under strongly reducing conditions in combination with oxidizing conditions. Although the waste stream has little carbonaceous content, carbonaceous materials such as sugars, charcoal, and activated carbon, can be present in the fluidizing reaction vessel for use as the heat source to evaporate water in the waste feed and as a reducing agent, or reductant. Other fluidizing gases, reductants and/or co-reactants may be utilized to further optimize the reducing conditions in the reactor. Typical other fluidizing gases include: hydrogen, oxygen (when oxidizing conditions are desired), methane, ammonia, carbon dioxide, carbon monoxide, and inert gases. Further, the use of such co-reactants or additives as clay and lime results in higher melting point product, as well as the formation of water-insoluble minerals. Product handling and off gas handling from the process includes the use of wet scrubbers and various filters, separators, pumps, and blowers.

Referring now to the FIGURE, there is shown a system according to a preferred embodiment of the present invention and generally indicated by reference number 10. System 10 includes a single reaction vessel 12. Waste feeds, which may be comprised of liquids, liquid slurries and sludges 14 and/or solids 16, are fed into the reaction vessel 12. In the case of the liquids, liquid slurries and sludges 14, a pneumatic pump, perisalitic pump or progressive cavity 18 may be employed for delivery of the pumpable fluids to the reaction vessel 12. In the case of the solids 16, a screw auger 20 or pneumatic transfer system may be employed to deliver the solid waste stream into the reaction vessel 12.

As the method of the present invention addresses the mineralization of heterogenous wastes, the process centers on the addition of co-reactants and/or additives to the reaction vessel 12. Co-reactants 13 such as lime, clay, kaolin clay, magnesium compounds, calcium compounds, aluminum compounds, phosphate compounds, and silica compounds are mixed with the heterogenous waste feed before it is introduced into reaction vessel. This mixing step allows the co-reactants 13 to bind the alkali metals, heavy metals, sulfur, and halogens into a stable mineral form. The mixing of the co-reactants 13 with the heterogenous waste before introducing these materials into the reaction vessel is a feature of the present invention. The mixing of the effective amount of co-reactants 13, such as clay and lime, with wastes containing alkali metals, heavy metals, halogens, sulfur, boron, and phosphates, allows these waste materials to be bound in stable mineral form. Not only does this feature result in easier disposal of the heterogenous waste, but also the process results in little to no inventory of unreacted co-reactant in the reaction bed. Therefore, the overall product weight can be controlled and the co-reactants do not dilute the final products. Alternatively, co-reactants 13 may be added separately into reaction vessel 12 as shown in the FIGURE without first mixing co-reactants 13 with the waste feed.

Preferably less than 10% by weight of unbound co-reactants are present in the reaction vessel 12 at any given time during the process. Accordingly, the amount of co-reactants within the fluid bed can be controlled so that the mineral products can be made to grow larger. However, the presence of small amounts of co-reactants can help prevent agglomeration to the point of ceasing the fluidization of the reactor.

As previously stated, the addition of co-reactants to form synthetic, naturally occurring minerals that are preferably water-insoluble, as well as to form higher melting point solid products, is another feature of the present invention. A problem faced in disposing of heterogenous waste such as that described in the present invention is that products formed by typical treatment processes are water-soluble. In the case that these water-soluble products also contain radioactive isotopes, additional stabilization of the products such as grouting, solidification, or vitrification, prior to disposal will be required to prevent water dissolution of the buried product into the ground water. Accordingly, the formation of water-insoluble minerals is both advantageous and desirable, because they are more easily disposed of and processed. It is also desirable to select and produce a product that is non-hygroscopic. The term non-hygroscopic refers to compounds that do not form hydrates. Solids that form hydrates, such as sodium carbonate, can swell over time and can rupture or damage the containers they are stored in.

In an effort to address these problems, the following products listed with their main elemental constituents for simplicity can be made in the present process through the addition of certain co-reactants: Nosean (Na—Al—Si—$SO_4$), Nepheline (Na—Al—Si), Fairchildite (K—Ca—$CO_3$), Natrofairchildite (Na—Ca—$CO_3$), Dawsonite (Na—Mg—$CO_3$), Eitelite (Na—Mg—$CO_3$), Shortite (Na—Ca—$CO_3$), Parantisite (Na—Ti—Si), Maricite (Na—Fe—$PO_4$), Buchwaldite (Na—Ca—$PO_4$), Bradleyite (Na—Mg—$PO_4$—$CO_3$), Combeite (Na—Ca—Si), Olenite (Na—Al—$BO_3$—Si), Dravite (Na—Mg—Al—$BO_3$—Si), as well as other compounds for which there are no common mineral names, such as Ca—Si, Na—$PO_4$, Na—Al—$PO_4$, Na—(Ca,Fe,Mg)—Si, Na—Al—$PO_4$, Na—Al, and Na—Mg—$PO_4$. Not only are many of these minerals desirable because they are water insoluble, but they can also help to further process such wastes as radioactive isotopes. For example, the product Nepheline forms a crystalline cage mineral structure that effectively binds larger atoms, such as radionuclides and heavy metals that may be present in the waste.

In order to produce these mineral compounds, the following co-reactants can be utilized with each co-reactant being added in the proportions needed to generate the desired higher melting point compound, and/or water insoluble compound. The addition of lime (CaO) or other Ca compound such as calcium carbonate or calcium nitrate provides the conversion of alkali metals to a Ca rich final product such as Fairchildite. The carbonate is provided by any $CO_2$ that is present in the reaction vessel 12. The addition of magnesia (MgO) would produce minerals rich in magnesia, such as Eitelite. The addition of aluminum compounds such as kaolin clay and bentonite (alumina-silicates) can be used to produce Nepheline, Nosean, and other related sodium-alumina-silicates. The addition of other aluminum compounds such as aluminum nitrate, aluminum hydroxide, aluminum tri-hydrate ($Al(OH)_3$), or aluminum metal particles can be used to produce sodium aluminate. The addition of phosphate compounds can produce phosphate bonded ceramic media such as Maricite, Buchwaldite, Bradleyite or other $PO_4$ containing materials. The addition of silica compounds can be used to produce a sodium silicate product. The use of $CO_2$ to form a sodium carbonate product is also utilized in the present invention.

The use of co-reactants 13 is further advantageous because of the behavior of heavy metals, sulfur, and halogens in their presence. Co-reactants 13 can bind heavy metals, S, Cl, and F into solid sodium or calcium product matrix, or other non-volatile stable products. The resultant off-gas typically contains <5% of incoming S, Cl, and F. This high retention of normal acid gases in the solid product allows scrubber solutions to be recycled to the reaction vessel 12 thereby eliminating secondary scrubber solution waste. A specific co-reactant that can be used is lime. The S and halogens can be directly bonded by the addition of lime (CaO) to form $CaSO_4$ (gypsum) as a stable product or the S as $SO_4$ can be bound into the crystalline structure of certain mineral forms such as Nepheline thereby converting it to Nosean.

Another previously discussed advantage to the addition of co-reactants 13 is the formation of higher melting point compounds that will result in less agglomeration in the reaction vessel 12. Although the formation of higher melting point compounds helps to prevent agglomeration in the reaction vessel, some agglomeration is preferred in the present invention to increase the size of the mineral products. However, it is not desirable to have agglomeration to the point of ceasing the fluidization of the reactor. Therefore, another feature of the present invention is to add only the appropriate amounts of co-reactant 13 to effectively mineralize the alkali metals, halogens, phosphates, boron compounds, and sulfur, and to also prevent agglomeration to the point of ceasing the fluidization of the reaction vessel 12.

Preferably, the percentage of co-reactant 13 added to bind the alkali metals, heavy metals, boron compounds, phosphates, sulfur, and/or halogens is greater than 50% stoichiometric ratio, with a preferred range of 100% to 150% stoichiometric ratio, to produce the desired mineral product. A 100% stoichiometric ratio would equal 1 mole of co-reactant to 2 moles respective waste product (alkali metal, halogen, or sulfur). For example, to produce Nepheline, the preferred amounts of co-reactant to waste compound are as follows: 1 to 1.25 moles Kaolin clay ($Al_2O_3$-$2$-$SiO_2$) with 2 moles of Na.

In addition to co-reactants 13, fluidized media 22 may also be contained in reaction vessel 12. Such fluidized media 22 may also include inert media, such as alumina beads, as well as carbonaceous materials, co-reactants, reductants, catalysts, product solids, such as sodium compound product, in addition to or in lieu of the inert media. Various combinations of these materials may be used in the reaction vessel 12. For example, fluidized media 22 can include carbonaceous materials with product solids that have been formed during the process. The fluidized media 22 may further include catalysts, such as cerium, platinum, and palladium compounds, in combination with product solids. These catalysts are useful in lowering the energy of activation required for the various reactions happening within the vessel 12. For example, these catalysts reduce the energy of activation required to reduce any NOx waste that may be present in the waste feed.

Metal catalysts may also be included in the reaction vessel when there is nitrate waste present. Testing has demonstrated the usefulness of metal reductant additions or catalysts to the bed to facilitate NOx reduction. Metal additives are not always required but are useful in maximizing NOx conversion to nitrogen gas. Typical metals that can be used include copper compounds, cobalt compounds, manganese compounds, iron compounds, or nickel compounds, such as nickel oxalate, oxides, or nitrates that can be co-injected with the waste feed in concentrations of less than 0.5% up to 20%. Alternatively, metals can be separately injected into the bed. The preferred bed will contain 5% to 10% metal reductants. Most preferably, fluidizing media 22 includes a combination of carbonaceous materials, catalysts, co-reactants, reductants, and product solids.

The use of inert bed material is another feature of the present invention and is preferred for the start-up of the process. Inert ceramic media such as silica, mullite, corundum, corderite, or alumina may serve as a heat sink. Preferably, amorphous alumina beads are used according to the preferred embodiment of the present invention. Other types of inert media, such as quartz or silica sand, tend to form agglomerations in the reaction vessels more easily than alumina. Specifically, amorphous alumina will not form eutectic salt/glasses that can form harmful agglomerates that affect reactor efficiency as when common silica sand or quartz sand is utilized. The amorphous alumina is also exceptionally strong and hard and resists attrition due to reaction bed friction and impact. Preferably, the size of the alumina beads is at least 200 and, most preferably up to 1000 microns in diameter; however, beads up to 5,000 microns in diameter can be utilized. Such size beads do not easily elutriate out of the vessel 12 and therefore minimize carryover.

Although the waste feed preferably contains less than 5% carbonaceous or organic content, carbonaceous materials are present in the reaction vessel 12 so as to provide a heat source and a reductant. Therefore, up to 20% carbonaceous or organic content may be present. The addition of charcoal or carbonaceous solids to the reaction bed in sizes ranging up to 0.5 inches in diameter is unique to the preferred embodiment. The large particles of carbon maintain a constant inventory of carbon that is not possible with typical fine sugars and organic powders or liquids. The presence of larger carbon solids together with the addition of soluble carbon in the form of formic acid, sugars, etc., provides superior reducing conditions. The presence of carbon compounds in the bed will produce highly reducing CO and $H_2$ in the bed via steam reformation. Additionally, carbonaceous reductants can be used to regenerate metal co-reactants and/or additives. For example, $Fe_2O_3$ and $Fe_3O_4$ are reduced to FeO and/or Fe through the use of carbonaceous reductants and hydrogen.

As previously stated, the use of at least one reducing zone or portion is a particular feature of the present invention. The use of a reducing zone is preferable so as to avoid incineration and/or burning operations. Further, it is believed that reducing conditions result in a higher retention of sulfur, halogens, and heavy metals in the mineralized product. These conditions are also preferable when the heterogenous waste contains nitrogen oxides. The reducing conditions convert these nitrogen oxides to $N_2$.

Accordingly, in order to evaporate water present in the waste feeds and to serve as a heat source, charcoal, sugar and/or other carbonaceous materials are added to or included in reaction vessel 12. Optionally, other chemical reducing agents or catalysts such as Fe, nickel oxalates, oxides, or nitrates, Cu, Co, and similar metals and metal oxides may be used.

Fluidizing gases are introduced into reaction vessel 12 via inlet 24. Steam is preferred to combustion gases as the fluidizing gas because it is more reactive, and generates CO and $H_2$ that are highly reducing by steam reformation of carbonaceous materials. However, the fluidizing gases can also include steam with reducing or fuel gases (including methane, carbon monoxide, and hydrogen), mixtures of steam, reducing gases and/or fuel gases, steam with inert gas, and steam with inert gas and carbon dioxide. Optionally, oxygen may also be introduced through nozzle 25 so as to convert synthesis gases, CO and $H_2$, which can form flammable mixes, into $CO_2$ and $H_2O$ prior to these gases exiting the reaction vessel. Steam can also be generated within reaction vessel 12 from the evaporation of water from the waste feed. Preferably, fluidizing gases can be recycled from the off-gas stream to save energy on the supply of fluidizing steam.

The reaction vessel 12 is preferably operated at a temperature less than 1000° C. Excessively high heat can volatize sulfur-containing compounds and some heavy metals, thereby separating them from the inorganic residues, volatize certain radionuclides and cause unwanted agglomerations in the reaction vessel. At an operating temperature of less than 800° C., the reaction vessel 12 materials are prevented from becoming molten.

Any off-gas (OG) that is formed by the reactions within the vessel 12, including nitrogen gas, steam, other fluidizing gases, and fine particulates, pass through a reactor gas outlet 28 and to a scrubber/evaporator 40. Any non-gaseous residue or particulate collected in the scrubber/evaporator 40 is directed to residue separator 42 wherein the insoluble residue are separated from the soluble salt solution. The residue product is directed to the stabilization processor 36 or recycled to waste feed 14 while the salt solution is directed to salt separator 44 then to a salt dryer 46 and finally to a salt package 48. An optional filter 82 can be installed between the reactor gas outlet 28 and the scrubber/evaporator 40. Solids and fines in the off-gas stream collected by the optional filter 82 can be directed to product collector 34 or stabilization processor 36. However, downstream filter 82 need not be included if solids are separated from scrubber solution in scrubber 40. The scrubber solution may also be recycled to the waste feed through inlet 90 for incorporation of the solids and salts into solid products. These separated solids from the scrubber 40 may be introduced to the waste feed through an inlet 90. The cooled and scrubbed off-gas and water vapors then pass to condenser 50. The resultant water is directed to the recycled water tank 52 while the off-gas moves to optional thermal converter 54. Off-gases from the thermal converter 54 are then monitored for compliance with the applicable environmental requirements prior to release.

Fine solid products are also largely retained in the reaction vessel 12 by means of a solids separation device built into reaction vessel 12, such as a cyclone 80 (shown in the FIGURE), or a filter. Other small sized products, including entrained particulates also leave via port 28 and can thereafter be recycled to reaction vessel 12. Heavier solids and debris leave via port 30 and are carried away by screw auger 32 to optional collector 34. Auger 32 is preferably water or gas cooled. From collector 34 the larger solids and debris may be directed to stabilization processor 36 or to final product waste collector 38.

Preferably, collector 34 includes a metal separator, pneumatic classifier, and/or a screen separator for the recycling of metal reductants, catalysts and carbonaceous reductants. In the case that reaction vessel 12 contains only product particles and no alumina beads, a simple magnetic separator could separate iron-metal based reductants/catalysts from product for recycling of the reductants/catalysts to the reaction vessel 12.

The screw auger 32 can be optionally fitted with water washing capability. Water can be introduced into the bottom of screw auger 32 through inlet 60. Water dissolves any soluble sodium salt or other agglomerates that collect in the bottom of the reactor vessel 12. Salt water solution is removed from the bottom of reactor vessel 12 through screened outlet port 62. If desired, the salt water solution from outlet 62 can be collected in residue separator 42.

It will be apparent to those skilled in the art of processing alkali metal-, heavy metal-, halogen-, boron-, and phosphate-, and sulfur-containing waste feeds that many modifications and substitutions can be made to the preferred embodiment described above without departing from the spirit and scope of the present invention, which is defined by the appended claims.

What is claimed is:

1. A method for converting alkali metals, halogens, phosphorus, boron, heavy metals, sulfur or compounds thereof into substantially water-insoluble mineral products, comprising:

providing a waste material containing a component comprising at least one of an alkali metal, phosphorus, boron, a heavy metal, a halogen, sulfur, and a compound thereof;

providing a reaction vessel containing a fluidizable reaction bed, wherein said fluidizable reaction bed contains inert particles or carbonaceous materials;

heating said reaction bed to an operating temperature of less than 1000° C.;

fluidizing said heated reaction bed with a fluidizing gas comprising methane, steam, carbon dioxide, carbon monoxide, oxygen, nitrogen, hydrogen, or a combination thereof, wherein said waste material contains a nitrogen oxide group and a co-reactant is provided in said reaction bed to convert the nitrogen in said nitrogen oxide group to nitrogen gas;

providing in at least part of said heated fluidized reaction bed a mixture of said waste material with a co-reactant comprising calcium, magnesium, iron, aluminum, phosphorus, silicon, a calcium compound, clay, kaolin clay, a magnesium compound, an iron compound, an aluminum compound, a phosphorus compound, a silicon compound, or a combination thereof;

operating said at least part of said heated fluidized reaction bed under reducing conditions to form a mineral product that is substantially insoluble in ground water and that comprises at least one of Nosean, Nepheline, Fairchildite, Natrofairchildite, Dawsonite, Eitelite, Shortite, Parantisite, Maricite, Buchwaldite, Bradleyite, Combeite, Olenite, Dravite, Ca—Si, Na—(Ca,Fe,Mg)—Si, Na—Al—$PO_4$, Na—Mg—$PO_4$ and other substantially water-insoluble mineral forms comprising at least one of calcium, magnesium, iron, aluminum, phosphorus and silicon, wherein said substantially water-insoluble mineral product is formed in said heated fluidized reaction bed;

removing said substantially water-insoluble mineral product from said reaction vessel; and collecting said substantially water-insoluble mineral product for disposal in a storage container.

2. The method as recited in claim 1, wherein said reaction bed comprises ceramic beads made of a material comprising silica, alumina sand, mullite or corderite.

3. The method as recited in claim 1, wherein said reaction bed comprises amorphous alumina beads that are at least 200 microns in diameter.

4. The method as recited in claim 1, wherein less than 10% of said co-reactant in said reaction bed is unbound.

5. The method as recited in claim 1, wherein less than 5% of said co-reactant in said reaction bed is unbound.

6. The method as recited in claim 1, wherein said mineral product has a higher melting point than said waste component.

7. The method as recited in claim 1, wherein said co-reactant comprises a non-hydrated compound of aluminum.

8. The method as recited in claim 1, wherein said co-reactant comprises elemental aluminum or aluminum metal.

9. The method as recited in claim 1, further comprising mixing at least a portion of said waste material with said co-reactant to form a mixture, and wherein said mixture is provided in said fluidized reaction bed.

10. The method as recited in claim 1, wherein a part of said reaction bed is operated under oxidizing conditions.

11. The method as recited in claim 1, wherein said mixture is formed before being provided in said reaction bed.

12. The method as recited in claim 1, wherein said waste material contains a radionuclide and said radionuclide is contained in said substantially water-insoluble mineral product.

13. The method as recited in claim 1, wherein a stoichiometric ratio of said co-reactant to said waste component is greater than 50%.

14. The method as recited in claim 1, wherein a stoichiometric ratio of said co-reactant to said waste component is between 100% and 150%.

* * * * *